United States Patent

Novak

[11] Patent Number: 5,958,847
[45] Date of Patent: Sep. 28, 1999

[54] ENVIRONMENTALLY COMPATIBLE SOLID FILM LUBRICANT

[75] Inventor: Howard L. Novak, Indiatlantic, Fla.

[73] Assignee: United Technologies Corporation, Hartford, Conn.

[21] Appl. No.: 08/994,767

[22] Filed: Dec. 19, 1997

[51] Int. Cl.[6] ...................... C10M 125/22; C10M 125/26
[52] U.S. Cl. ........................................... 508/156; 508/167
[58] Field of Search ..................................... 508/156, 167

[56] References Cited

U.S. PATENT DOCUMENTS

| | | | |
|---|---|---|---|
| 4,715,972 | 12/1987 | Pacholke | 508/156 |
| 5,282,985 | 2/1994 | Zabinski et al. | 508/156 |
| 5,431,830 | 7/1995 | Erdemir | 508/156 |

*Primary Examiner*—Jacqueline V. Howard
*Attorney, Agent, or Firm*—Norman Friedland; Marvin S. Aronoff

[57] ABSTRACT

A solid film lubricant useful for aerospace and other heavy machinery applications comprising a mixture of boric acid and molybdenum disulfide in a polymeric binder comprising a silicone polymer and an epoxy resin is provided. Boric acid and compounds related to boric acid can be effectively used as inorganic lubricant components in solid film lubricants in place of graphite thereby avoiding galvanic corrosion induced by graphite. The boric acid containing solid film lubricant provides superior lubrication at the high stress levels common for booster rockets and other aerospace applications, but without inducing galvanic corrosion, or exposing workers and the environment to toxic materials such as lead compounds. In addition, it affords substantial savings in labor, due to the need for only one coat, and savings in energy due to the substantially lower cure temperature of about 450° F. compared to 1000° F. for a currently used two coat ceramic system. There is also a significant savings in time, hazardous waste disposal costs and human protection costs by using the boric acid containing SFL.

11 Claims, 5 Drawing Sheets

ENVIRONMENTALLY COMPATIBLE SOLID FILM LUBRICANT

BACKGROUND OF THE INVENTION

This invention deals with the field of solid film lubricants, more particularly the solid film lubricants used on booster rocket components and associated launch apparatus.

Multi-body launch vehicles require the use of solid film lubricants (SFLs) to allow for unrestricted relative motion between structural assemblies and components during lift-off and ascent into orbit. They are also used on fasteners to provide precise torque-tension relationships during clamping and also de-torquing. The solid film lubricants used for these purposes must provide adequate lubricity under conditions of extremely high load for a relatively short duration. In addition to providing lubrication under extremely high load conditions, the SFL must not promote corrosion. This factor is of major importance since booster vehicles and the apparatus associated with launching them are exposed to the corrosive action of sea air mist and fog prior to launch because the launch sites are generally situated in close proximity to the sea. As these vehicles are generally recovered from the sea after launch they are also exposed to the corrosive action of sea water.

To meet the requirements for lubricity, lead and antimony bearing compounds are commonly used. Although graphite is an effective lubricating component of SFL compositions, the tendency of graphite to create an electrolytic cell in the presence of sea water that results in corrosion of the metallic surface to which it has been applied, severely limits its use for this application. To avoid this problem, antimony compounds have been used instead of graphite in some SFL formulations. Cadmium plated fasteners are also in common use because of the corrosion protection and lubrication provided by a cadmium surface. However, when cadmium plated fasteners are used on aluminum alloys electrolytic corrosion results. Although technically useful in some SFL applications, cadmium, lead and antimony compounds are also highly toxic to humans and other animal life. In addition, the environmentally safe disposal of lead, cadmium and antimony derivatives presents a major problem from both the safety and economic points of view. The costs for disposal of these hazardous materials continues to escalate and adequate protection for humans while using or disposing of these materials borders on the impossible.

In current practice, a ceramic bonded basecoat solid film lubricant (SFL) that contains a high level of lead compounds and graphite is initially applied to the solid rocket booster hardware by spray coating and then cured at 1000° F. in an oven. Prior to application the part must be masked. The coated part is then masked again and a lead containing silicone topcoat is then spray applied. The top-coated part is then subjected to a second curing operation at 500° F. The process of applying and curing this dual coat system is extremely complicated, costly and also hazardous. Due to its lead content the ceramic bonded basecoat is hazardous to the health of those applying it, while the presence of graphite causes corrosion and pitting of the reusable solid rocket booster in the presence of sea water, thereby reducing its service life. The need to cure at 1000° F. requires a high level of energy expenditure and special heating apparatus. The requirement for two coats and the precautions that must be taken to avoid poisoning the workers are costly in both materials and time. Furthermore, in the event of damage such as a break in the ceramic two coat SFL system, repair is difficult, costly and inconvenient.

There is, therefore, a need for a solid film lubricant composition for use on rocket boosters and associated launch apparatus as well as in other heavy machinery applications that can provide lubricity for moving parts under extremely high load conditions, while at the same time not promoting corrosion of the substrate metal. The SFL must, in addition, be environmentally safe while being relatively non-toxic to humans, be easy to apply, preferably in one coat, and require relatively low cure temperatures and be relatively inexpensive to manufacture and use. Furthermore, should the SFL become damaged, it should be easy to repair in an inexpensive safe and convenient manner.

BRIEF DESCRIPTION OF THE INVENTION

The present invention is directed to meeting the foregoing needs by providing a solid film lubricant composition comprising a combination of finely divided orthoboric acid or boric oxide and finely divided molybdenum disulfide ($MoS_2$) dispersed in an organic polymeric matrix typically comprising a blend of partially cured epoxy resin and a silicone polymer. The orthoboric acid or boric oxide and $MoS_2$ combination work together to provide durable, low coefficient of friction lubricity without dissimilar material corrosion. The epoxy resins improve load carrying capacity whereas the silicone resins improve high temperature properties and coefficient of friction. The composition is dispersed in a relatively innocuous organic solvent comprising a solvent selected from the group consisting of ethyl acetate (CAS #141-78-6), P.M. Acetate (CAS #108-65-6), methyl ethyl ketone (CAS #78-93-3) isobutyl ketone (CAS #108-10-1) and mixtures thereof and, if necessary, is diluted to an appropriate consistency and is applied in a single coat to the substrate metal part by spraying, dipping or brushing and is then cured at about 450° F. Under high load testing, the system exceeds the minimum requirements of 1000 cycles in a test designed to check the effectiveness of SFLs, and shows a level of lubricity comparable to a currently used ceramic based two coat system that contains lead and graphite.

The SFL of the present invention is environmentally acceptable as it utilizes only $MoS_2$ and boric acid or boric oxide derivatives both of which are known to be relatively innocuous to humans. In addition, corrosion due to the presence of graphite is eliminated by completely replacing graphite with orthoboric acid which provides lubricity without creating electrolytic corrosion in the presence of a sea water atmosphere. As only a single coat is required and cure occurs at 450° F., the SFL of the present invention provides substantial savings in labor costs and materials. Since only one coat is required and cure occurs at a relatively low temperature, it is also easy to repair small areas of the SFL without any loss of effectiveness.

DESCRIPTION OF THE PREFERRED EMBODIMENTS

Figure 1:
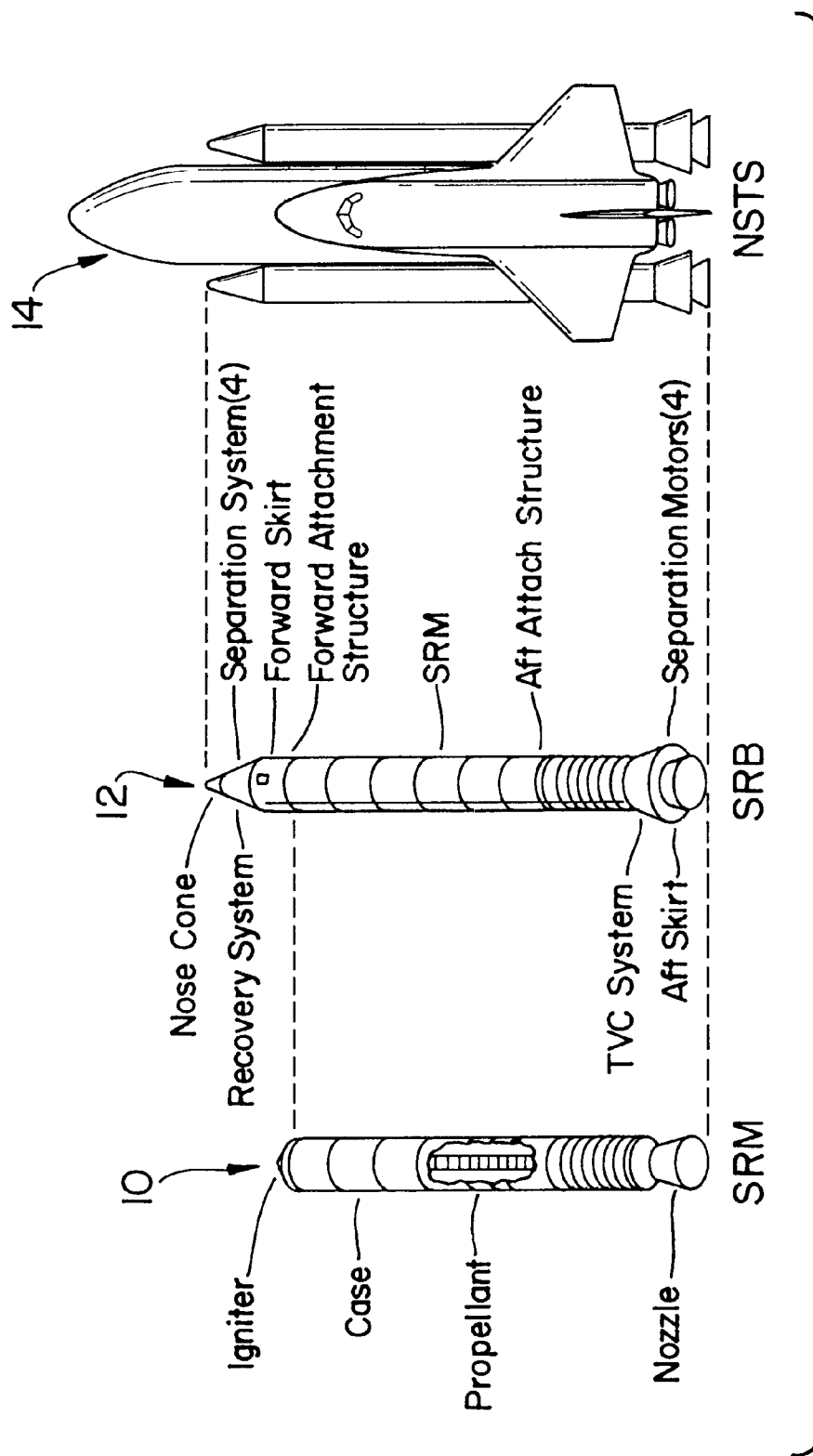
FIG. 1 is a sketch depicting the basic parts of the space shuttle system showing the interrelationship between the solid rocket motor (SRM), the solid rocket booster (SRB) and the space shuttle orbiter (NSTS).
Figure 2:
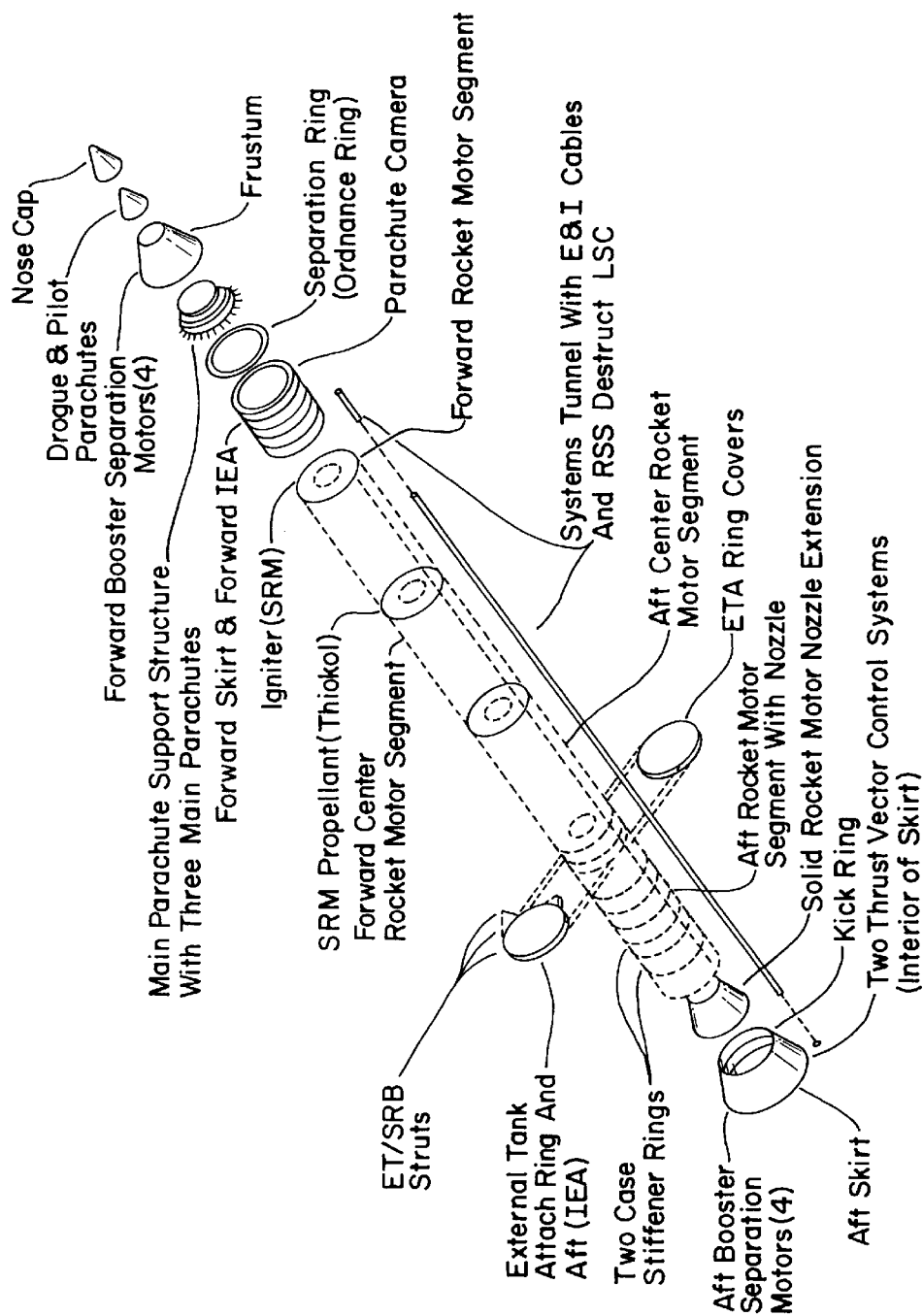
FIG. 2 is a sketch depicting the component parts of a solid rocket booster.
Figure 3:
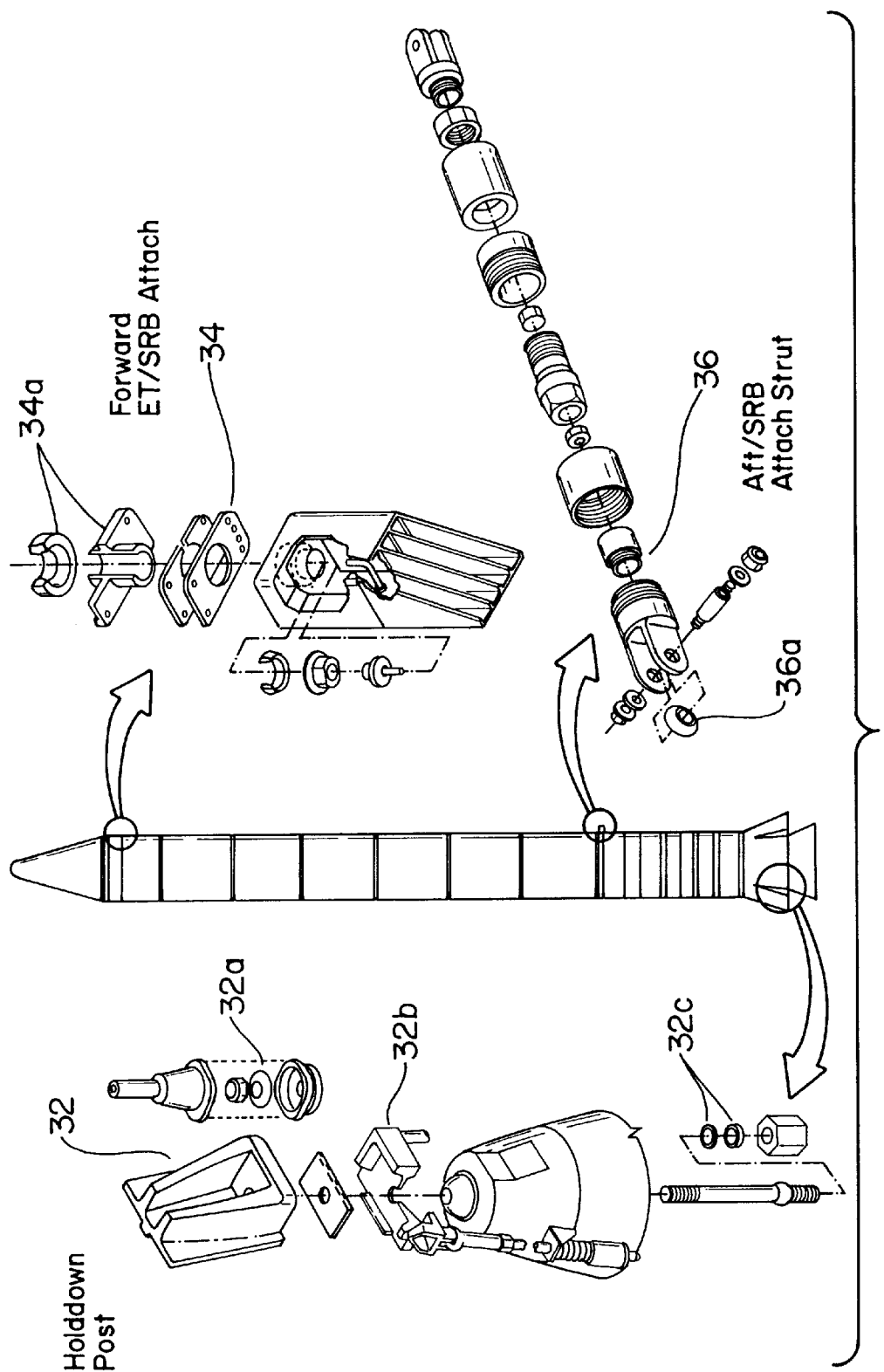
FIG. 3 is a sketch depicting typical areas of lubricant application on SRB flight hardware requiring the use of a solid film lubricant (SFL).

FIG. 1 depicts the basic components of the space shuttle system showing the interrelationship between the solid rocket motor (SRM), the solid rocket booster (SRB) and the space shuttle orbiter (NSTS). Multi-body launch vehicles require the use of solid film lubricants (SFLs) to allow for unrestricted relative motion between structural assemblies and components during lift-off and ascent into orbit. The Space Shuttle's Solid Rocket Booster (SRB) uses a dual coat, ceramic-bonded high temperature SFL in several locations, such as restraint hardware between the SRB aft skirt and the Mobile Launch Platform (MLP); the aft SRB/External Tank (ET) attach struts; and the forward skirt SRB/ET attach ball assembly. FIG. 2 depicts the component parts of a solid rocket booster and FIG. 3 depicts the typical areas of lubricant application on SRB flight hardware requiring the use of a solid film lubricant (SFL).

The solid film lubricant of the present invention comprises a combination of finely divided boric acid and/or boric oxide and finely divided molybdenum disulfide ($MoS_2$) dispersed in an organic polymeric matrix typically comprising a blend of B stage epoxy resin having unreacted functional groups and a silicone polymer having unreacted functional groups. The inorganic lubricant components, typically boric acid and/or boric oxide and $MoS_2$ work together to provide durable, low coefficient of friction lubricity without dissimilar material corrosion. The epoxy resins improve high load carrying capacity whereas the silicone resins provide high temperature functionality and a binder with a low coefficient of friction. The composition is dispersed in a relatively innocuous organic solvent comprising a solvent selected from the group consisting of ethyl acetate (CAS #141-78-6), P.M. Acetate (CAS #108-65-6), methyl ethyl ketone (CAS #78-93-3), methyl isobutyl ketone (CAS #108-10-1) and mixtures thereof. If necessary, the formulation is diluted to an appropriate consistency, preferably with a relatively innocuous solvent such as ethyl acetate, and is applied in a single coat to the substrate metal part by spraying, dipping or brushing and is then cured at about 425° F. to about 500° F. with about 450° F. preferred as the curing temperature. Under high load testing, the system exceeds the minimum requirements of 1000 cycles in a test designed to check the effectiveness of SFLs, and shows a level of lubricity comparable to a currently used ceramic based two coat system that contains lead and graphite.

The SFL of the present invention is environmentally acceptable and acceptable in the work place as it utilizes only $MoS_2$ and orthoboric acid or boric oxide derivatives as solid state inorganic lubricant additives both of which are known to be relatively innocuous to humans. In addition, corrosion due to the presence of graphite is eliminated by the use of boric acid which provides lubricity without creating electrolytic corrosion in the presence of a sea water atmosphere.

As is known in the art, inorganic materials can be used effectively as lubricants for applications that expose the lubricated surfaces to high temperatures, vacuum, high operating loads and combinations of these and other conditions that make the use of conventional lubricating oils and greases unfeasible. Such materials are used either by themselves or as part of a bonded solid film lubricant. Such bonded solid film lubricants generally combine an inorganic lubricant or combination of inorganic lubricants in a binder system comprising a ceramic or polymeric matrix. Typical inorganic lubricants are molybdenum disulfide ($MoS_2$), antimony trioxide ($Sb_2O_3$) and graphite. Inorganic lubricants generally are layer-lattice solids wherein strong covalent or ionic bonds bind the atoms within each layer but only relatively weak van der Waals forces operate to bind a given layer to other layers. Thus under appropriately applied force the individual layers comprising these solids slip past each other thereby providing "slip-plane" lubricity.

Crystalline orthoboric acid ($B(OH)_3$), metaboric acid (HOB=O), boric oxide ($B_2O_3$) and other borates are known to exist in the solid state in the form of two dimensional sheets (see for example, Moeller, *Inorganic Chemistry*, published by John Wiley and sons, 6th printing, April, 1957, pp. 808–811). Erdemir, et al have reported on the "Tribology of naturally occurring boric acid films on boron carbide," *in Surface and Coatings Technology*, 86–87 (1996) 507–510. They report that the presence of a film of orthoboric acid formed by hydrolysis of boric oxide on boron carbide surfaces can account for the lubricity of those surfaces. It is known that orthoboric acid can be converted to metaboric acid and ultimately to boric oxide by thermal dehydration and boric oxide can be converted to metaboric acid and boric acid by reaction with water (see for example Moeller above and *Kirk-Othmer Concise Encyclopedia of Chemical Technology*, published by John Wiley and sons, 1985. pp. 176–177).

By using orthoboric acid, metaboric acid, boric oxide or a mixture thereof in place of graphite in a bonded solid film lubricant formulation, a solid film lubricant formulation is produced that exhibits a low coefficient of friction and eliminates the problem of galvanic corrosion that occurs when a graphite containing SFL is placed in contact with dissimilar metals in a sea water or salt fog environment. An effective amount of orthoboric boric acid to obtain approximately the equivalent lubricity of an SFL containing about 5% to about 15% graphite by weight, based on the weight of the dry ingredients, is about 4% to about 13% by weight of orthoboric acid, based on the weight of the dry ingredients, with about 5% to about 12% preferred. Metaboric acid, boric oxide or a mixture thereof may be used in place of orthoboric acid with their weight calculated on the basis of their reaction with water to ultimately form orthoboric acid.

Boron compounds and mixtures of boron compounds that can function as an inorganic lubricant in the solid film lubricant composition of the present invention comprise compounds of boron and oxygen that can exist in the solid state in the form of two dimensional sheets. Typically, the formulation comprising the SFL of the present invention contains a finely divided solid compound of boron and oxygen or a hydrated form thereof selected from the group consisting of orthoboric acid ($B(OH)_3$), metaboric acid (HOB=O), boric oxide ($B_2O_3$) and mixtures thereof. However, any other compound of boron and oxygen and hydrated forms thereof, that exist in the form of two dimensional sheets in the solid state can also be used in the formulation. $B(OH)_3$ and $B_2O_3$ are preferred with $B(OH)_3$ most preferred.

A solid lubricant component of the SFL of the present invention comprises a compound selected from the group consisting of orthoboric acid (also referred to as boric acid), metaboric acid, boron oxide or mixtures thereof in an amount ranging from about 4% to about 13% by weight, based on the weight of orthoboric acid in the dry formulation, with about 5% to about 12% preferred.

Another component of the SFL formulation of the present invention that functions as an inorganic lubricant is molybdenum disulfide ($MOS_2$). The SFL of the present invention comprises about 4% to about 16% of molybdenum disulfide, based on the dry weight of the solid formulation, with about 5% to about 15% preferred.

The SFL of the present invention further comprises a polymeric binder, with the polymeric binder comprising a mixture of silicone polymer having reactive functional groups and B stage epoxy resin having unreacted functional groups for chain extension and cross-linking. In practice, formulations of polymeric siloxanes such as methylphenylsiloxane, dimethylsiloxane and mixtures thereof may be used as the silicone polymer component of the polymeric binder. Silicone polymer formulations comprising methylphenylsiloxane are preferred as they have a higher operational temperature range. Typical commercially available formulations of methylphenylsiloxane polymers include SR882M and SR125 supplied by GE silicones, Waterford, N.Y. Formulations such as silicone SR882M are preferred since they have relatively high levels of compatibility with epoxy resin formulations such as Epon 828. However, any other generally equivalent silicone formulation produced by other manufacturers may be used. As is known in the art, small quantities, of a catalyst such as zinc octoate or zinc naphthenate must be added to the formulation prior to application to promote cure of the silicone component. The quantities of such catalysts range from about 0.15% to about 0.3% (as metal) based on the weight of the silicone resin.

The epoxy resin component of the polymeric binder comprises a bisphenol-epichlorohydrin based resin. Commercially available resins suitable for this purpose include resins such as Epon Resin 828, 1007, 1009 and Eponol resin 55 (available from Shell Chemical Company); Araldite 6097 and 7097; and Epi-Rez 540 C; with Epon 828 preferred. However, any other generally equivalent epoxy resin formulation produced by other manufacturers may be used. As is known in the art, these resins must be cross-linked or hardened with appropriate curing agents. Epon 828A may, for example be crosslinked with formulations containing MDA (methylenedianiline), Shell catalyst Z or any other suitable epoxy curing agent commonly used in the art.

The polymeric binder may encompass a wide range of compositions ranging from about 90% silicone polymer and about 10% epoxy resin to about 10% silicone polymer and about 90% epoxy resin based on the dry weight of the polymeric binder. High levels of silicone produce a relatively soft, compliant binder, while high levels of epoxy resin produce a harder less compliant binder. Blends of about 25% silicone with about 75% epoxy and about 75% silicone with about 25% epoxy produced good polymeric binders for a general use SFL, however a blend of about 50% silicone resin with about 50% epoxy resin is preferred for an SFL used on rocket boosters as it had the best durability.

In general, however, the polymeric binder may be comprised solely of silicone polymers, or an epoxy resin or other types of polymers known in the art to be useful for an SFL binder such as polyimides and phenolic resins and mixtures thereof. The type and composition of the binder and exact quantity of orthoboric acid, metaboric acid or boron oxide as well as other constituents will depend on the specific application of the SFL.

The SFL of the present invention may be prepared using conventional apparatus known in the art for the preparation of pigmented polymeric coating formulations that are dispersed in an organic solvent such as stirrers, blenders, mills and the like, and any other means known in the art for blending a silicone polymer dispersion with an epoxide resin dispersion and solid pigments in an organic solvent. The SFL of the present invention is preferably prepared in an environment having low relative humidity. A relative humidity of about 60% to about 70% is preferred. To avoid condensation of moisture, the temperature of the environment in which the SFL is prepared and applied and the part temperature should be about 5° F. to about 10° F. above the dew point.

Typically, the silicone polymer formulation and epoxy resin formulation are blended in conventional stirring apparatus and diluted with a solvent selected from the group consisting of ethyl acetate (CAS #141-78-6), P.M. Acetate (CAS #108-65-6), methyl ethyl ketone (CAS #78-93-3), methyl isobutyl ketone (CAS #108-10-1) and mixtures thereof. During this process the finely ground solid components are added and thoroughly dispersed in the mixture. Preferred solvents are ethyl acetate (CAS #141-78-6) and P.M. Acetate (CAS #108-65-6). The solids content of the stock SFL dispersion is about 40%. However, this may vary depending on the quantities of solids used for a specific SFL formulation.

For use in spraying with conventional spray equipment, the stock SFL formulation may be diluted approximately 1:1 by volume with an appropriate solvent, preferably ethyl acetate. If necessary, the stock SFL dispersion may be diluted to any appropriate consistency for application in a single coat to the substrate metal part by spraying, dipping or brushing. After application to a metallic part, the SFL is typically cured in an oven in air at atmospheric pressure at about 425° F. to about 500° F. for about 60 minutes to about 90 minutes. As is known in the art, in order to optimize performance, the surface of the cured SFL is burnished with a lint and oil-free cloth until the dull matte finish is replaced with a gloss finish.

The following examples, using an SFL having about 5% to about 12% orthoboric acid on the weight of the solid SFL, about 5% to about 15% $MoS_2$ on the weight of the solid SFL, in a polymeric binder comprising about 50% silicone polymer and about 50% epoxy resin on the dry weight of the resin binder, illustrate the advantages of the boron containing SFL of the present invention:

EXAMPLE 1

This example demonstrates that the coefficient of friction of the cured one coat boric acid containing SFL is lower than the coefficient of friction of a lead containing SFL currently in use on rocket boosters that uses a graphite containing ceramic base-coat and a graphite containing silicone top-coat.

Coefficient of friction was measured according to the standard ASTM test procedure, ASTM D 2714, in Annual Book of ASTM Standards, Vol. 05.02, "Petroleum Products and Lubricants," ASTM, Philadelphia, Pa. 1992 , which is herein incorporated by reference. The results shown in Table 1 indicate that the cured one coat boric acid, $MoS_2$ containing SFL has a coefficient of friction equal to or better than the cured two coat graphite, lead containing ceramic/silicone system.

TABLE 1

Coefficient of Friction via D-2714 Block on Ring

| SFL | Friction Coefficient |
|---|---|
| One coat: | 0.075 |
| silicone/epoxy Boric Acid, MoS$_2$ | |
| Two coat: | 0.090 |
| 1) Ceramic, lead, graphite | |
| 2) Silicone, lead, graphite | |

EXAMPLE 2

This example demonstrates that the boric acid containing SFL formulation does not promote corrosion of a coated metallic part.

Inconel 718 coupons were coated with the one coat boric acid, MoS$_2$ containing SFL and exposed to 5% salt solution for 2, 7 and 14 days. The results, shown in Table 2 compared to typical results observed with Inconel 718 coated with a two coat graphite, lead containing ceramic/silicone SFL, demonstrate that the boric acid containing SFL does not promote corrosion.

TABLE 2

Effect of 5% Salt Solution on Inconel 718 Coated With SFL

| SFL | Exposure Time (Days) | Corrosion Observed |
|---|---|---|
| One coat: | 2 | None |
| silicone/epoxy | 7 | None |
| Boric Acid, MoS$_2$ | 14 | None |
| Two coat: | 2 | Slight surface discoloration |
| 1) Ceramic, lead, graphite | 7 | Darkening of surface discoloration |
| 2) Silicone, lead, graphite | 14 | Pitting of surface initiated |

EXAMPLE 3

This example demonstrates that the wear life of the cured one coat boric acid containing SFL is higher than the wear life of a lead containing SFL currently in use on rocket boosters that uses a graphite containing ceramic base-coat and a graphite containing silicone top-coat.

Wear life was measured according to the standard ASTM test procedure, ASTM D 2714, in Annual Book of ASTM Standards, Vol. 05.02, "Petroleum Products and Lubricants," ASTM, Philadelphia, Pa. 1992, which is hereby incorporated by reference. The results shown in Table 3 demonstrate that the cured one coat boric acid, MoS$_2$ containing SFL has a wear life 5.7 times greater than the cured two coat graphite, lead containing ceramic/silicone system.

TABLE 3

Wear Life via D-2714 Block on Ring

| SFL | Average Number of Cycles |
|---|---|
| One coat: | 100,000 |
| silicone/epoxy Boric Acid, MoS$_2$ | |
| Two coat: | 17,500 |
| 1) Ceramic, lead, graphite | |
| 2) Silicone, lead, graphite | |

EXAMPLE 4A

This example demonstrates the load capacity performance of the boric acid containing SFL using the standard ASTM D-2625-B pin and vee block test published in Annual Book of ASTM Standards, Vol. 05.02, "Petroleum Products and Lubricants," ASTM, Philadelphia, Pa. 1992, which is herein incorporated by reference.

The results shown in Table 4A demonstrate that the cured one coat boric acid, MoS$_2$ containing SFL has a load capacity that exceeds the minimum acceptable standard for rocket booster application, but is somewhat lower than load capacity of the cured two coat graphite, lead containing ceramic/silicone system.

TABLE 4A

Load Capacity via ASTM D-2625 Pin and Vee Block

| SFL | Load (lbs) |
|---|---|
| One coat: | 3,250 |
| silicone/epoxy Boric Acid, MoS$_2$ | |
| Two coat: | 4,000 |
| 1) Ceramic, lead, graphite | |
| 2) Silicone, lead, graphite | |
| Minimum acceptable standard | 2,250 |

EXAMPLE 4B

This example demonstrates the performance of the boric acid containing SFL under the very high stresses encountered with booster rockets and other heavy machinery.

Figure 4A:
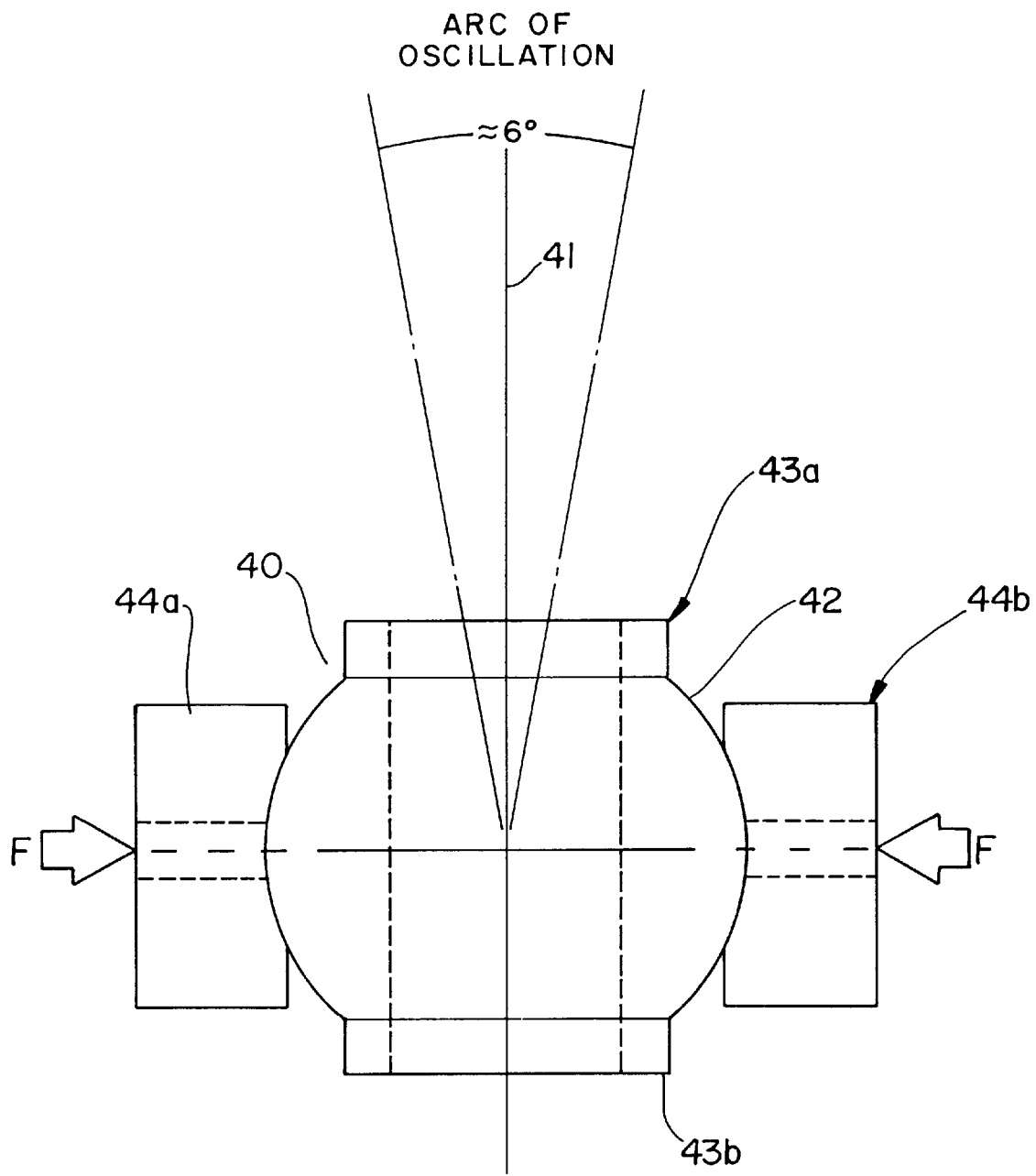
FIG. 4A is a cross-sectional view depicting the mono-ball-in-block high load capacity test used to test wear life of solid film lubricants.
Figure 4B:
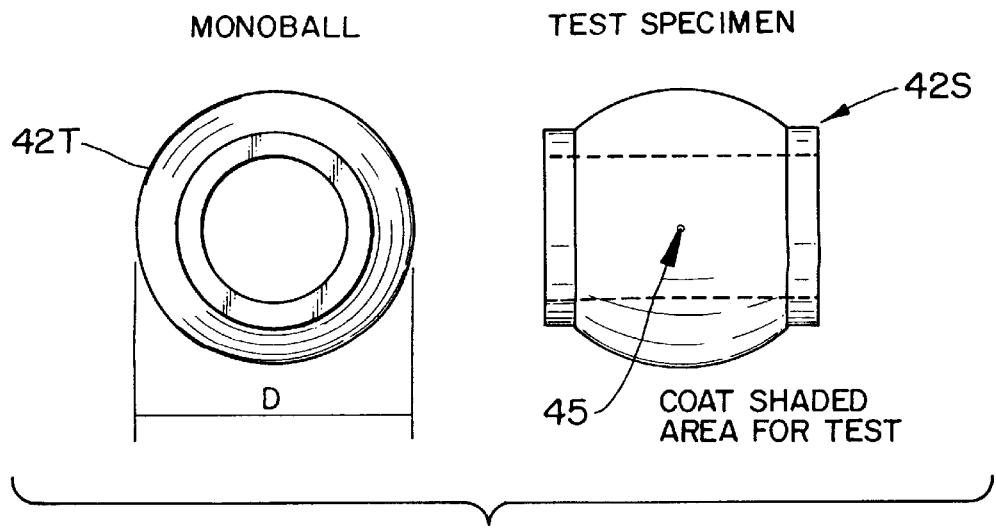
FIG. 4B depicts a top view and a side view of the mono-ball of the test apparatus of FIG. 4A showing the area to which the SFL test specimen is applied.
Figure 4C:
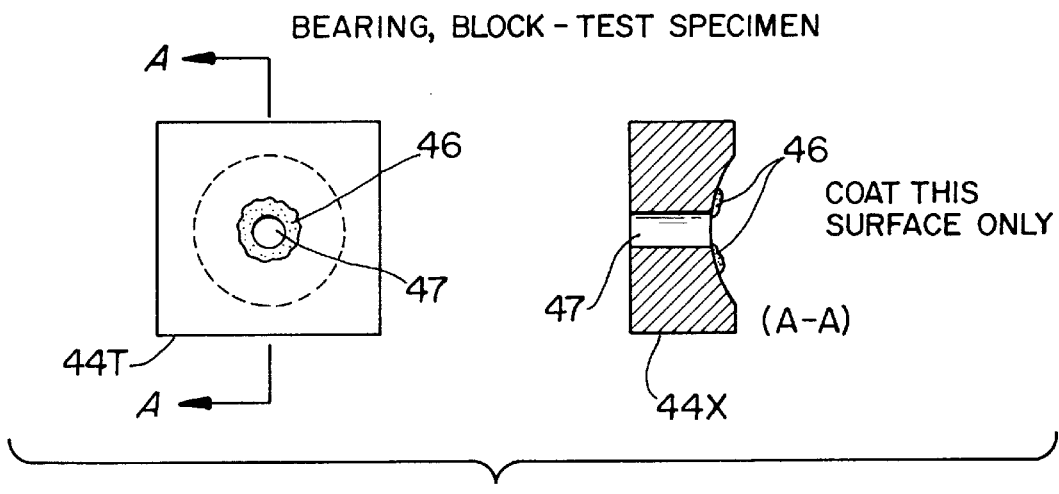
FIG. 4C depicts a top view and a cross-sectional view of the block of the test apparatus of FIG. 4A showing the area to which the SFL test specimen is applied.

As is known in the art, high load bearing capacity is essential for an SFL used on heavy machinery. In the case of an SFL intended for aerospace application, such as lubrication of rocket booster components, the wear life must meet or exceed a standard of 1000 cycles under an applied load of 110,000 pounds per square inch in a mono-ball-in-block test apparatus developed at the Marshall Space Flight Center to simulate the very high stresses exerted at the holddown post (FIG. 3, 32a, 32b, 32c) and upper external tank attach point (FIG. 3, 34a) during the period that the booster rocket-shuttle assembly (FIG. 1, 14) is on the stand prior to and during launch. The high load test apparatus is depicted in FIGS. 4A, 4B and 4C. With regard to FIG. 4A, B, C: hollow metallic mono-ball 42, having a 2 inch diameter, is held between metallic concave blocks 44a and 44b. Tooling to oscillate the mono-ball thru a total arc of about 6° is attached to rod 41 which passes through flanges 43a and 43b. This duplicates the total amount of movement the Shuttle stack can experience during cryogenic tanking and launch. During the period of the test, a load of 110,000 pounds per square inch is applied to blocks 44a and 44b. FIG. 4B shows a top view 42T looking down at the flange of mono-ball 42 and a side view 42S showing the area 45 that is coated with the SFL. Area 45 generally encompasses about 0.5 square inch. A second SFL area is placed 180° opposite the initial area. FIG. 4C shows a top view 44T of blocks 44a and b looking down into the concavity and a cross-sectional view 44X along line A—A of 44T. The concave surface of blocks 44 a and b are coated with the SFL in zone 46 around hole 47 which is about 0.25 inch in diameter shown in FIG. 4C. The coating encompasses an area of about 0.5 square inch per block. The mono-ball is placed within the block so that the SFL coated areas on the block cover the SFL coated areas on the mono-ball. When the test is run with SFL on both the mono-ball and the block, the coated areas 45 and 46 rub against each other. When the test is run without a coating on the mono-ball, the metallic surface of the mono-ball rubs against the SFL coating on the blocks 44a and 44b at areas 46. During the test the ball is oscillated through a total arc of about 6° at a maximum of 0.5 Hz. A contact stress of about 110,000 psi is developed at points 45 and 46. Rod 41 is attached to a load cell. During the test, data is received via the load cell. The point of failure is reached when the force required to move rod 41 as measured by the load cell equals or exceeds 500 lbs. At the failure point mild to extensive galling has occurred at the ball and block interface. The number of cycles to failure is reported. The results shown in Table 4 demonstrate that the cured one coat boric acid, MoS$_2$ containing SFL has superior performance compared to the cured two coat graphite, lead containing ceramic/silicone system. Even with only the block coated and the ball uncoated, the boric acid containing SFL exceeded the standard of 1000 cycles under an applied load of 110,000 pounds per square inch.

TABLE 4

High Load Mono-Ball in Block Test

| SFL | Coated Areas | Number of Cycles to Failure (Avg.) |
|---|---|---|
| One coat: | Block and Ball | 3,000 |
| silicone/epoxy Boric Acid, MoS$_2$ | | |
| Two coat: | Block and Ball | 1,000 |
| 1) Ceramic, lead, graphite 2) Silicone, lead, graphite | | |
| One coat: | Block only | 1,350 |
| silicone/epoxy Boric Acid, MoS$_2$ | | |

EXAMPLE 5

This example demonstrates that approximately the level of lubricity produced by about 5% to about 15% by weight of graphite in an SFL, based on the weight of the dry SFL ingredients, can be obtained with about 5% to about 12% by weight of orthoboric acid, based on the weight of the dry SFL ingredients.

An SFL having about 5% to about 15% graphite on the weight of the solid SFL, about 5% to about 15% MoS$_2$ on the weight of the solid SFL, in a polymeric binder comprising about 50% silicone polymer and about 50% epoxy resin on the dry weight of the resin binder was prepared. The coefficient of friction, measured by the procedure of Example 1, of the dry cured SFL was compared to an SFL formulation containing about 5% to about 12% orthoboric acid on the weight of the solid SFL. As can be seen in Table 5, the coefficient of friction of the SFL is lower than the graphite containing SFL.

TABLE 5

Coefficient of Friction via D-2714 Block on Ring

| SFL | Friction Coefficient |
|---|---|
| One coat: | 0.075 |
| silicone/epoxy Boric Acid, MoS$_2$ | |
| One coat: | 0.148 |
| silicone/epoxy Graphite, MoS$_2$ | |

From the foregoing, it is clear that boric acid and compounds related to boric acid can be effectively used as inorganic lubricant components in solid film lubricants and that the boric acid containing SFL of the present invention provides superior lubrication at the high stress levels common for booster rockets and other aerospace applications, but without inducing galvanic corrosion, or exposing workers and the environment to toxic materials such as lead compounds. In addition, it affords substantial savings in labor, due to the need for only one coat, and savings in energy due to the substantially lower cure temperature of about 450° F. compared to about 1000° F. for a currently used two coat ceramic system. There is also a significant savings in time, hazardous waste disposal costs and human protection costs by using the boric acid containing SFL. The SFL of the present invention may be used as a lubricant in other applications outside of the field of aerospace. For example, it may be used to lubricate components of heavy machinery such as engines, ground support equipment, automatic machinery, machinery used in energy related fields, metallic fasteners of all kinds and any other component that is placed under very high stresses and where galvanic corrosion is a problem and where there is a need to avoid toxic heavy metals for human safety and environmental protection.

Although the present invention has been described in considerable detail with reference to certain preferred versions thereof, other versions are possible. Therefore, the spirit and scope of the appended claims should not be limited to the description of the preferred versions contained herein.

What is claimed is:

1. A solid film lubricant comprising:
    a binder comprising a polymeric matrix, with the binder containing:
        a boron compound in an amount effective in producing lubricity with the boron compound selected from the group consisting of orthoboric acid, metoboric acid, boric oxide and mixtures thereof, about 5% to 15% by weight of molybdenum disulfide based on the weight of the solid film lubricant; and the polymeric matrix being selected from the group consisting of methylphenysiloxane polymer, bishpenol-epichlorohydrin based resin and mixtures thereof.

2. The solid film lubricant of claim 1 in which the polymeric matrix comprises about 25% to about 75% by weight of methylphenylsiloxane polymer based on the weight of the dry polymeric matrix.

3. The solid film lubricant of claim 2 comprising about 4% to about 13% orthoboric acid based on the weight of the solid film lubricant.

4. The solid film lubricant of claim 3 in which the polymeric matrix comprises about 50% by weight of methylphenylsiloxane polymer and about 50% by weight of bisphenol-epichlorohydrin based resin, based on the weight of the dry polymeric matrix.

5. The solid film lubricant of claim 4 comprising about 5% to about 12% orthoboric acid based on the weight of the solid film lubricant.

6. A method of eliminating galvanic corrosion induced by graphite in a solid film lubricant formulation comprising:

replacing the graphite in the formulation with a boron compound in an amount effective in producing a level of lubricity about equal to the level of lubricity produced by the graphite, with the boron compound selected from the group consisting of orthoboric acid, metaboric acid, boric oxide and mixtures thereof.

7. The method of claim 6 in which the effective amount is about 4% to about 13% by weight of the boron compound as orthoboric acid, based on the dry weight of the solid film lubricant formulation.

8. The method of claim 7 in which the effective amount is about 5% to about 12% by weight of the boron compound as orthoboric acid, based on the dry weight of the solid film lubricant formulation.

9. The method of claim 8 in which the solid film lubricant comprises a binder comprising a polymeric matrix, with the binder containing about 5% to about 15% by weight of molybdenum disulfide based on the weight of the solid film lubricant.

10. The method of claim 9 in which the polymeric matrix is selected from the group consisting of methyphenylsiloxane polymer, bishpenol-epichlorohydrin based resin, polyimide resin and mixtures thereof.

11. The method of claim 9 in which the polymeric matrix is selected from the group consisting of methylphenylsiloxane polymer, bishpenol-epichlorohydrin based resin and mixtures thereof.

* * * * *

UNITED STATES PATENT AND TRADEMARK OFFICE
CERTIFICATE OF CORRECTION

PATENT NO. : 5,958,847
DATED : Sept. 28, 1999
INVENTOR(S) : Novak

It is certified that error appears in the above-identified patent and that said Letters Patent is hereby corrected as shown below:

In claim 9, column 12, line 9, change "8" to --6--

Signed and Sealed this

Eighteenth Day of April, 2000

Attest:

Q. TODD DICKINSON

Attesting Officer     Director of Patents and Trademarks